(12) United States Patent
Lu et al.

(10) Patent No.: US 12,583,336 B2
(45) Date of Patent: Mar. 24, 2026

(54) BATTERY MODULE AND ELECTRIC VEHICLE

(71) Applicant: SAIC MOTOR CORPORATION LIMITED, Shanghai (CN)

(72) Inventors: Kewei Lu, Shanghai (CN); Dingxian Zhou, Shanghai (CN); Zhao Li, Shanghai (CN); Dong Xu, Shanghai (CN); Pengfei Zhao, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 404 days.

(21) Appl. No.: 18/037,256

(22) PCT Filed: Nov. 17, 2020

(86) PCT No.: PCT/CN2020/129376
§ 371 (c)(1),
(2) Date: Nov. 27, 2023

(87) PCT Pub. No.: WO2022/104514
PCT Pub. Date: May 27, 2022

(65) Prior Publication Data
US 2024/0123838 A1    Apr. 18, 2024

(51) Int. Cl.
B60L 50/64        (2019.01)
B60L 58/26        (2019.01)

(52) U.S. Cl.
CPC .............. B60L 50/64 (2019.02); B60L 58/26 (2019.02); B60L 2240/545 (2013.01)

(58) Field of Classification Search
CPC .... B60L 50/64; B60L 58/26; B60L 2240/545; B60L 58/16; B60L 2240/547; H01M 10/0481; H01M 10/625; H01M 10/647; H01M 10/6555; H01M 10/6557; H01M 10/6563; H01M 10/658; H01M 50/209;
(Continued)

(56) References Cited

U.S. PATENT DOCUMENTS 11,482,738 B2    10/2022  Jin et al.
2016/0164061 A1   6/2016  Han et al.

FOREIGN PATENT DOCUMENTS

CN         206657824 U    11/2017
CN         209249567 U     8/2019
(Continued)

*Primary Examiner* — Justin Holmes
(74) *Attorney, Agent, or Firm* — Volpe Koenig

(57) ABSTRACT
A battery module includes: a plurality of cells; and a cell restraining structure having an internal frame and an external shell fit with the internal frame to form a plurality of chambers for receiving the plurality of cells respectively so as to package and manage the cells. The internal frame includes an elastic element forming at least one first surface of each chamber, the elastic element being elastically deformed as being pressed by a predetermined amount by a corresponding cell received in each chamber such that the elastically deformed elastic element exerts a first force to the corresponding cell. The elastically deformed elastic element is further pressed or tends to recover in responding to reversible expansion or contraction of the corresponding cell in operation such that a restraining force to the corresponding cell is determined by the first force.

16 Claims, 8 Drawing Sheets

(58) Field of Classification Search
CPC .. H01M 50/213; H01M 50/24; H01M 50/291;
H01M 50/293; H01M 10/613; Y02E
60/10
See application file for complete search history.

(56)                    References Cited

FOREIGN PATENT DOCUMENTS

| CN | 210535738 | U |   | 5/2020 |
|----|-----------|---|---|--------|
| CN | 210897379 | U |   | 6/2020 |
| CN | 111446397 | A |   | 7/2020 |
| CN | 211428293 | U | * | 9/2020 |
| CN | 111769221 | A |   | 10/2020 |
| JP | 2009043675 | A | * | 2/2009 |

* cited by examiner

BATTERY MODULE AND ELECTRIC VEHICLE

CROSS REFERENCE TO RELATED APPLICATIONS

This disclosure claims the benefit of priority of International Patent Application No. PCT/CN2020/129376, filed on Nov. 17, 2020, which is hereby incorporated by reference in its entirety.

TECHNICAL FIELD

The present application relates to the field of power battery technology and, more particularly, to a battery module and an electric vehicle.

BACKGROUND

Power batteries and particularly secondary power batteries such as lithium-ion batteries are applied to more and more transportation means such as vehicles, vessels, aircrafts, etc. as important energy storage devices. The transportation means can obtain power all or mostly from the power batteries which are discharging continuously as needed. For meeting power demands of the various transportation means, the power batteries are designed with constantly increasing energy densities and hence are manufactured in a constantly improving manner such that the power batteries can be applied to the transportation means in a safer, more cost-effective, and more flexible way.

Currently, there are basically two solutions for manufacturing the power batteries which are especially suitable for being applied to an electric vehicle. The first solution is set to manufacture the power batteries in three levels including a cell level to a module level and to a pack level, resulting in a large number of components, low integration efficiency and high manufacturing cost. The second technical solution is set to manufacture the power batteries in two levels including the cell level to the pack level such that cells are fixed directly into a tray of a battery pack by an adhesive so as to remove the module level, resulting in complex manufacturing processes, insecurity and high maintenance cost.

SUMMARY

An object of the present application is to provide an improved battery module and an electric vehicle powered by the battery module. The battery module provided by the present application is served as a modular power battery which is a fully functional energy storage device with highly integrated and simplified components and the battery module provided by the present application can be manufactured on a platform with high integration efficiency, high security and low maintenance cost. Depending on power demands of electric vehicles in variety, one or more battery modules can be fit directly into an appropriate body part of an electric vehicle to power the electric vehicle.

According to an aspect of the present application, there is provided a battery module comprising: a plurality of cells; and a cell restraining structure comprising an internal frame and an external shell fit with the internal frame to form a plurality of chambers for receiving the plurality of cells respectively so as to package and manage the plurality of cells, wherein the internal frame comprises an elastic element forming at least one first surface of each of the plurality of chambers, the elastic element being elastically deformed as being pressed by a predetermined amount by a corresponding cell received in each of the plurality of chambers such that the elastically deformed elastic element exerts a first force to the corresponding cell, and wherein the elastically deformed elastic element is further pressed or tends to recover in responding to reversible expansion or contraction of the corresponding cell in operation such that a restraining force to the corresponding cell is determined by the first force.

Optionally, the elastically deformed elastic element is further pressed to its elastic deformation limit in responding to the beginning of an irreversible expansion of the corresponding cell in operation.

Optionally, the elastic element is a laminate comprising two elastic layers and a thermal insulating layer interposed between the two elastic layers.

Optionally, the internal frame further comprises a thermal insulating element forming at least one second surface of each of the plurality of chambers, the thermal insulating element supporting the plurality of cells and having a low thermal conductivity.

Optionally, the elastic element comprises a plurality of elastic elements and the thermal insulating element comprises a plurality of insulating elements, the pluralities of elastic elements and thermal insulating elements being arranged alternately and to be perpendicular to each other to form the at least one first and second surfaces of each of the plurality of chambers, the first surface having an area greater than that of the second surface.

Optionally, the external shell comprises a cooling element for supporting and cooling the plurality of cells and comprising a cooling plate for forming a third surface of each of the plurality of chambers, the cooling plate being adhered to the plurality of cells via a thermally conductive adhesive.

Optionally, the external shell covers the internal frame and is connected to the cooling plate to enclose the plurality of chambers.

Optionally, the cooling element comprises reinforcing ribs extending perpendicularly to the cooling plate on both sides of the cooling plate, the reinforcing ribs being connected to the external shell and applying a second force greater than the first force to the plurality of cells via the external shell.

Optionally, the plurality of chambers is divided into first and second sets of chambers and the cooling plate comprises first and second cooling surfaces opposite with each other, the first cooling surface forming a third surface of each of the first set of chambers and the second cooling surface forming a third surface of each of the second set of chambers.

Optionally, the cell restraining structure comprises an electrically insulating element interposed between the external shell and the plurality of cells, the electrically insulating element being adhered to the external shell and the plurality of cells by a thermally conductive adhesive and having a high thermal conductivity.

Optionally, the cell restraining structure comprises a smoke guiding element interposed between the external shell and the plurality of cells, the smoke guiding element being configured to define a smoke passage for the plurality of cells.

Optionally, the smoke guiding element comprises a body panel made of an electrically insulating material having a high thermal conductivity, the body panel having a surface facing the external shell and being adhered to the external shell by a thermally conductive adhesive.

Optionally, the smoke guiding element further comprises a flange disposed on a surface of the body panel that faces the plurality of cells, the flange resting against the plurality of cells to form the smoke passage.

Optionally, the flange comprises first flange portions protruding perpendicular to the body panel on both sides of the body panel, second flange portions spaced inwardly from the first flange portions and extending parallel to the first flange portions, and third flange portions formed between the first and second flange portions and extending perpendicular to the first and second flange portions, the second flange portions being provided with at least one opening.

Optionally, the first flange portions are made of a material with a thermal conductivity and the second and third flange portions are made of a material with a low thermal conductivity.

Optionally, a thermal insulating pad is disposed on a surface of the plurality of cells that faces the smoke guiding element.

Optionally, the external shell comprises a pressure relief valve disposed on one end side of the battery module, the pressure relief valve being oriented horizontally such that smoke flowing through the smoke passage to the pressure relief valve is discharged laterally to an external environment.

Optionally, the pressure relief valve is covered by a filter element such that the smoke flowing through the smoke passage to the pressure relief valve is filtered by the filter element in advance.

According to another aspect of the present application, there is provided an electric vehicle comprising: a battery module compartment; and one or more battery modules as described above to be fit into the battery module compartment by one or more physical or electrical connectors.

The individual components of the cell restraining structure of the battery module provided by the present application are used to package and manage the plurality of cells individually or in groups and are optimally utilized to improve the integration efficiency of the battery module. Particularly, the elastic element allows for better control of force to the cells in operation. Particularly, the thermal insulating element can support the cells and impede heat transfer between the cells. Particularly, the efficiency of the cooling element can be improved by dividing the plurality of cells into two sets and symmetrically arranging the two sets of cells with respect to the cooling element. Particularly, the electrically insulating element can electrically insulate the cells from the external shell and prevent damage to the cells during a process of assembling the external shell. Particularly, the smoke guiding elements can optimize thermal runaway protection of the cells.

Other features of the present application and its advantages will become clear from the following detailed description of exemplary embodiments of the application with reference to the accompanying drawings.

BRIEF DESCRIPTION OF THE DRAWINGS

The attached drawings, which are incorporated in and constitute a part of the specification, illustrate embodiments of the present application and, together with the description thereof, serve to explain the principles of the present application.

DETAILED DESCRIPTION OF THE PREFERRED EMBODIMENTS

Figure 1:
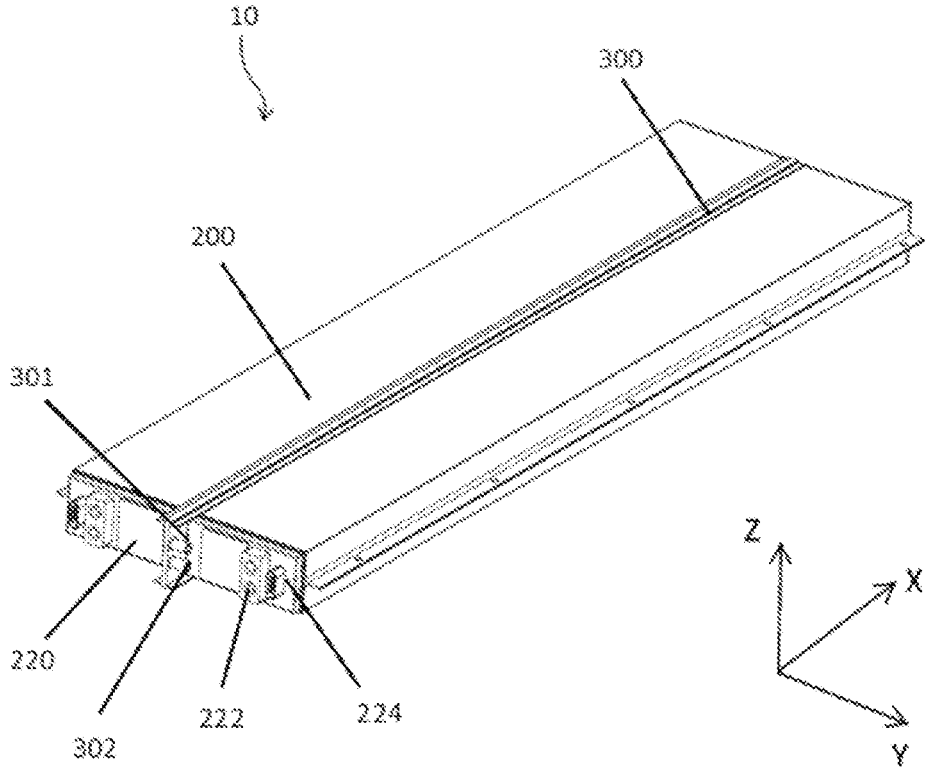
FIG. 1 is an assembled view of a battery module according to an embodiment of the present application.

Various exemplary embodiments of the present application will now be described in detail with reference to the drawings. It should be noted that the relative arrangement of the components and steps, the numerical expressions, and numerical values set forth in these embodiments do not limit the scope of the present application unless it is specifically stated otherwise.

Techniques, methods and apparatus as known by one of ordinary skill in the relevant art may not be discussed in detail but are intended to be part of the specification where appropriate.

In all examples of the embodiments discussed herein, any specific values should be interpreted as merely illustrative and not as exclusive. Thus, the embodiments may have different values.

It should be noted that similar reference numerals and letters refer to similar items in the accompanying drawings, and thus once an item is defined in one figure, it is possible that it need not be further discussed for following figures. The relative orientation of a battery module provided by the present application will be described below with reference to an orthogonal coordinate system consisting of an X-axis, a Y-axis and a Z-axis based on a viewing direction to the accompanying drawings, but this is not intended to limit the configuration of the battery module.

It should also be noted that the battery module provided by the present application can perform a stand-alone operation without being further packaged such that the battery module can be applied directly to transportation means such as an electric vehicle which is a power consuming apparatus by means of one or more physical or electrical connectors.

A battery module 10 assembled in FIG. 1 is suitable for use in an electric vehicle which may be a pure-electric vehicle or a hybrid-electric vehicle in the present application. For example, the electric vehicle has a battery module compartment (not shown) on its chassis and one or more battery modules 10 can be fit into the battery module compartment by one or more physical or electrical connectors such that the one or more battery modules 10 are fixed within the battery module compartment and electrically connected to an electric motor of the electric vehicle. A particular battery module compartment has a volume corresponding to a multiple of the volume of the battery module 10 based on a power demand of a particular electric vehicle such that the battery module 10 can be mass produced to be applied to different electric vehicles.

Figure 2:
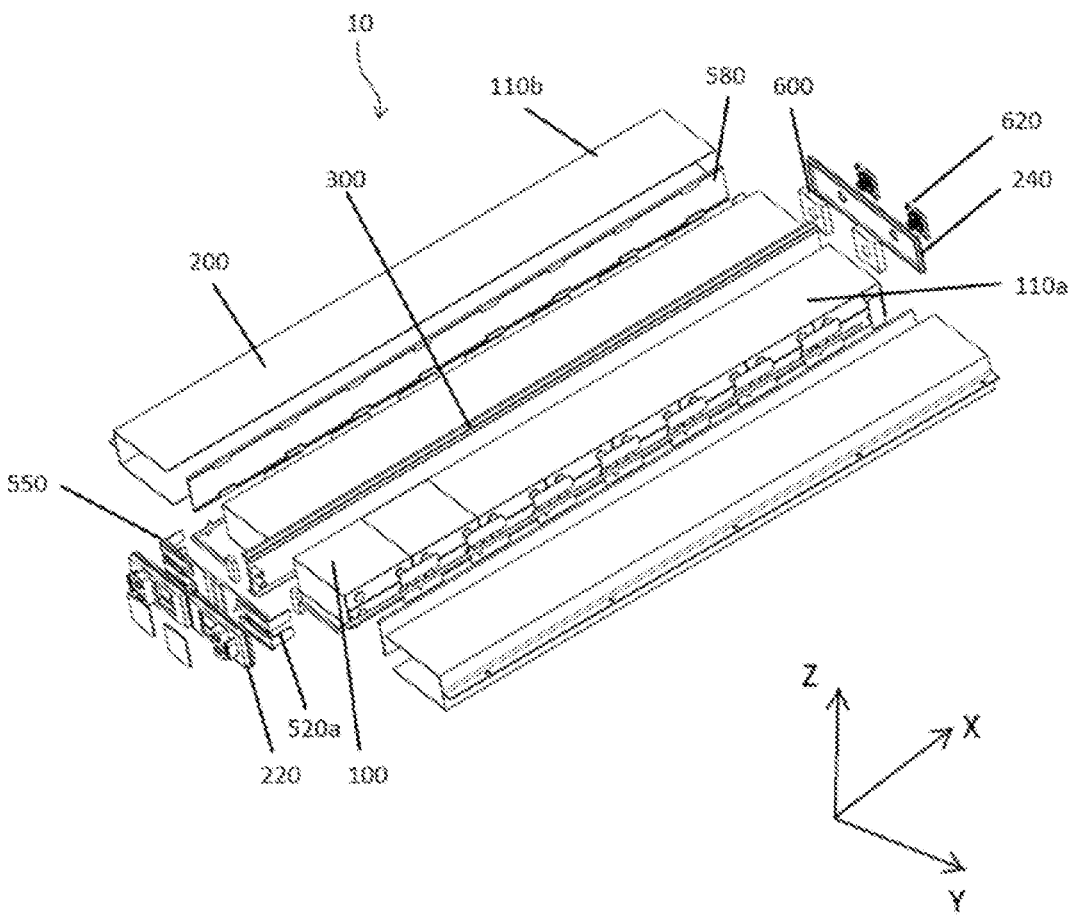
FIG. 2 is an exploded view of the battery module of FIG. 1.

The battery module 10 disassembled in FIG. 2 shows a plurality of cells 100 in the interior of the battery module. For example, the cells 100 are ternary lithium cells. The cells 100 may include but are not limited to different types of cells such as hard-shell cells, pouch cells and cylindrical cells depending on materials and shapes of shells for the cells. By way of example only, the cells 100 described below each are shaped as a six-sided cube comprising an upper surface and a lower surface opposite to each other in a Z-axis direction, a front surface and a rear surface opposite to each other in a Y-axis direction, and two side surfaces opposite to each other in an X-axis direction. The upper and lower surfaces each have a significantly larger area and are referred to hereinafter as a main surface.

The battery module 10 comprises a cell restraining structure, for packaging the plurality of cells 100, which means supporting, isolating and sealing the plurality of cells 100 in a physical space, and for managing the plurality of cells 100, which means managing the plurality of cells 100 in three aspects including electrical connection, thermal conduction and thermal runaway protection. Unless otherwise noted, components of the cell restraining structure are shaped and sized corresponding to a shape and size of each of the plurality of cells 100 and/or a shape and size of a cell set 110 comprising the plurality of cells 100 so as to achieve a robust structure of the battery module 10.

Optionally, the cell restraining structure comprises an internal frame and an external shell fit with the internal frame to form a plurality of chambers in the form of rows and columns for receiving and securing the plurality of cells 100 respectively.

Figure 3:
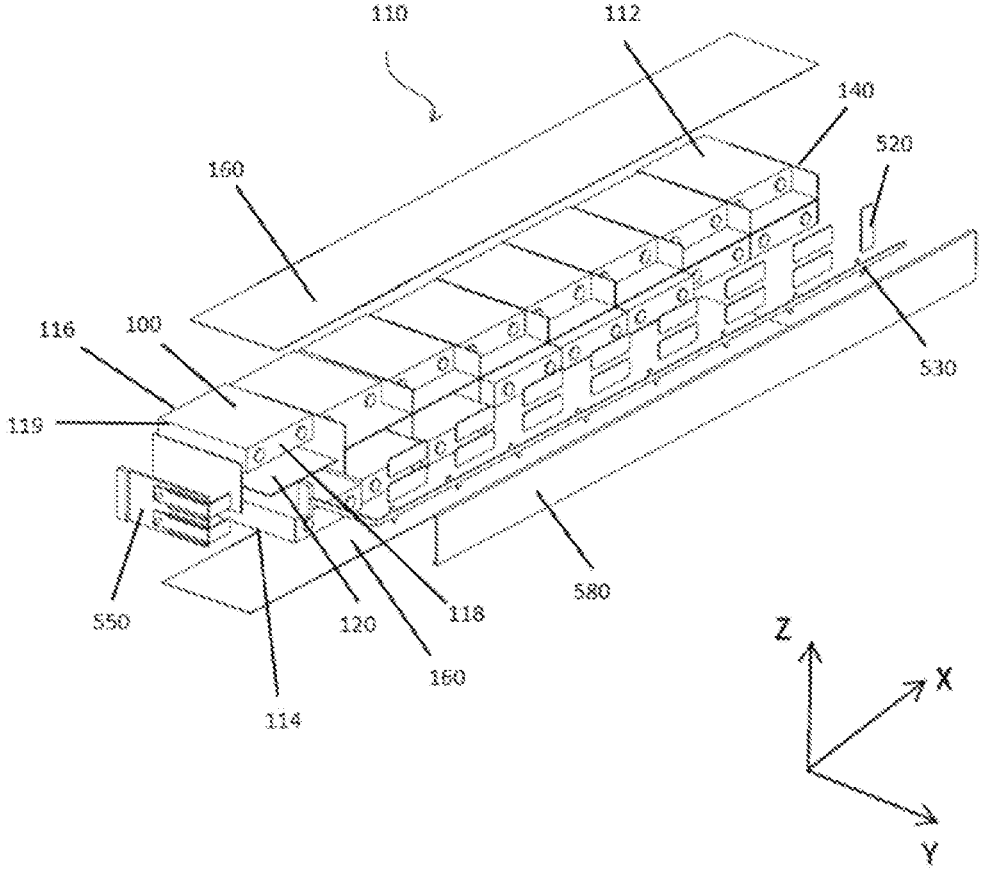
FIG. 3 is a detailed exploded view of a part of the battery module of FIG. 1.

Referring to FIG. 3, the internal frame comprises an elastic element 120 forming at least one first surface of each chamber and a thermal insulating element 140 forming at least one second surface of each chamber, the first surface abutting an upper surface and/or a lower surface of a corresponding cell 100, and the second surface abutting one or both of two side surfaces of the corresponding cell 100. Thus, each chamber has the first surface with an area larger than that of the second surface.

As shown, there are provided a plurality of thermal insulating elements 140 and a plurality of elastic elements 120 which may be sheet materials and arranged alternately and to be perpendicular to each other to form a plurality of opening spaces corresponding to the number of the plurality of cells 100 so as to place the plurality of cells 100 respectively. For example, the number of the thermal insulating elements 140 is N+1 and the number of the elastic elements 120 is N such that the number of the opening spaces formed is 2N, wherein N≥1 and is an integer.

During a process of assembling the cells 100, the plurality of cells 100 are first divided into multiple cell columns. For example, referring to FIG. 2 or FIG. 3, each cell column comprises upper and lower cells lying one above the other in the Z-axis direction and one elastic element 120 is interposed between the upper and lower cells. The elastic element 120 can apply a first force A (referring to FIG. 6) to the cells 100 in operation, which will be described in detail below. Optionally, the elastic element 120 is made of an elastic material such as a rubber, a foam and a structural adhesive.

Next, the multiple cell columns are arranged in a row in the X-axis direction, and the thermal insulating element 140 is interposed between two cell columns adjacent to each other for mitigating or even preventing heat transfer between the multiple cell columns. Optionally, the thermal insulating element 140 is made of a low thermal conductivity material including but not limited to an epoxy resin and an aerogel.

Alternatively, the thermal insulating elements and the elastic elements may have different numbers, sizes, and/or shapes to form the plurality of chambers in the form of different rows and columns based on a particular application scenario. Optionally, each cell column may comprise one or more than two cells 100. For example, each cell column comprises three cells 100, in which case the number of the thermal insulating elements 140 is N+1 and the number of the elastic elements 120 is 2N such that the number of the opening spaces formed is 3N. Each cell column comprises upper, middle and lower cells lying one above the other in the Z-axis direction, and two elastic elements 120 are interposed between the upper and middle cells and between the middle and the lower cells respectively.

Optionally, in order to mitigate heat transfer between the individual cells in each cell column, the elastic element 120 may be implemented as a laminate comprising two elastic layers and a thermal insulating layer interposed between the two elastic layers such that the laminate is both resilient and thermal insulating.

Referring again to FIG. 2 and FIG. 3, the plurality of cells 100 positioned in the plurality of opening spaces as a whole form the cell set 110 comprising an upper surface 112 and a lower surface 114 opposite to each other in the X-axis direction, a rear surface 116 and a front surface 118 opposite to each other in the Y-axis direction, and two side surfaces 119 opposite to each other in the Z-axis direction. That is, the upper surface of the cell set 110 comprises the upper surfaces of the upper cells of the multiple cell columns, the lower surface 114 of the cell set 110 comprises the lower surfaces of the lower cells of multiple cell columns, the rear surface 116 of the cell set 110 comprises the rear surfaces of the plurality of cells 100, the front surface 118 of the cell set 110 comprises the front surfaces of the plurality of cells 100, and the side surfaces 119 of the cell set 110 comprises the side surfaces of those cells of two cell columns disposed at two end sides of the cell set 110.

Optionally, the internal frame further comprises an insulating element 160 covering the upper and lower surfaces 112, 114 of the cell set 110 such that the electrically insulating element 160 is disposed between the external shell and the plurality of cells 100. The electrically insulating element 160 is adhered to the upper and lower surfaces 112, 114 of the cell set 110 via an adhesive. The electrically insulating element 160 may be a wear-resistant sheet material with a thickness between 0.2-0.5 mm that barely affects the volume of the plurality of chambers. The electrically insulating element 160 is configured to electrically insulate the upper surface 112, i.e. a main surface, of the cell set 110 from the external shell and at the same time prevent damage to the cell set 110 since the electrically insulating element 160 prevents the external shell from rubbing against the main surface of the cell set 110 during a process of assembling the external shell. Optionally, the electrically insulating element 160 is made of an electrically insulating material with a high thermal conductivity, including but not limited to a compound of silicone rubber and glass fiber, etc., such that the electrically insulating element 160 is both electrically insulating and has a good thermal conductivity so as not to impede heat dissipation from the main surface of the cell set 110.

It will be appreciated that the cell restraining structure further comprises an electrical system for electrical connection and electrical detection of the battery module 10. For example, the electrical system comprises a high-voltage connection device, a low-voltage sampling device and an electrical terminal device 550.

Still referring to FIG. 3, the front surface 118 of each cell 100 has two electrode tabs (or two electrode poles), i.e., a positive tab (or a positive pole) and a negative tab (or a negative pole). The positive and negative tabs each are partially covered by a tab cap provided with a thermal insulating diaphragm, for example, a mica diaphragm, etc., to prevent the temperature of an external environment from affecting the cell's operating performance.

The high-voltage connection device comprises a plurality of high-voltage connection pieces 520 which are for example aluminum bars, copper bars or other forms of current carriers. The high-voltage connection pieces 520 electrically connects the positive tab of one cell 100 and the negative tab of the other cell 100 of two cells 100 arranged adjacent to each other in the X-axis direction and electrically connects the positive tab of one cell 100 and the negative tab of the other cell 100 of a pair of cells 100 located at one end side of the cell set 110.

Optionally, the low-voltage sampling device comprises an FFC (Flexible Flat Cable), an FPC (Flexible Printed Circuit Board), a wire harness, or other forms of electrical signal carriers. The low-voltage sampling device comprises a metal sampling piece 530 electrically connected to the individual high-voltage connection pieces 520 for detecting voltages and temperatures of the individual cells 100 and transmitting electrical signals about the voltages and temperatures of the individual cells 100 to a BMS (Battery management system), which may be separate from or integrated into the battery module 10.

Optionally, the electrical terminal device 550 is attached for example by an adhesive to a thermal insulating element 140 which is disposed at the other end side of the cell set 110. The electrical terminal device 550 is integrally molded with, vacuum molded with, clamped to, or hot riveted to two high-voltage connection pieces 520a electrically connected to the positive tab of one cell 100 and the negative tab of the other cell 100 of a pair of cells 100 located at the other end side of the cell set 110 such that the voltages and currents provided by the plurality of cells 100 electrically connected by the plurality of high-voltage connection pieces 520 can be collected. The electrical terminal device 550 is clamped, screwed, or hot riveted to the low-voltage sampling device for transmitting the electrical signals about the voltages and temperatures of the individual cells 100.

The electrical system is fit tightly to the front surface 118 and the side surface of the cell set 110 in a suitable manner. For the sake of illustrating the other components of the cell restraining structure more clearly, a further description of the electrical system is reasonably omitted.

Figure 4:
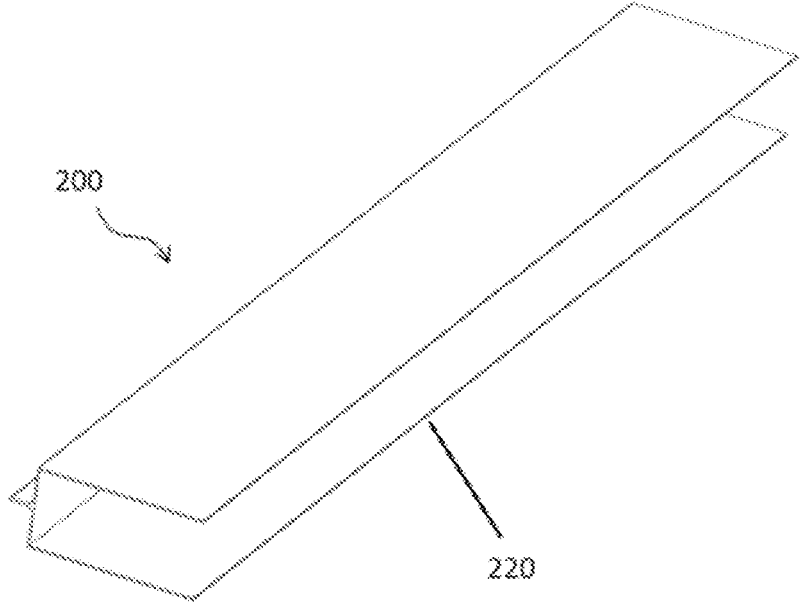
FIG. 4 is a perspective view of an external shell of a battery module according to an embodiment of the present application.

Then, assembled is the external shell, which is optionally made of a metallic material and covering the internal frame and the main surface, the front surface 118 and the two side surfaces 119 of the cell set 110 so as to provide a packaging stiffness to the battery module 10. Optionally, the external shell comprises: profiled bodies 200, with a cross-section similar to a U-shape (referring to FIG. 4), to match with the main surface and the front surface 118 of the cell set 110; and first and second end plates 220, 240 disposed at both sides of the profiled bodies 200, the first end plate 220 being provided with high-voltage and low-voltage interfaces 222, 224 to provide electrical output ports to the electrical terminal device 550 (referring to FIG. 1), and the second end plate 220 being provided with a filter element 600 for filtering combustibles in smoke and a pressure relief element 620 surrounded or covered by the filter element (referring to FIG. 2).

Figure 5:
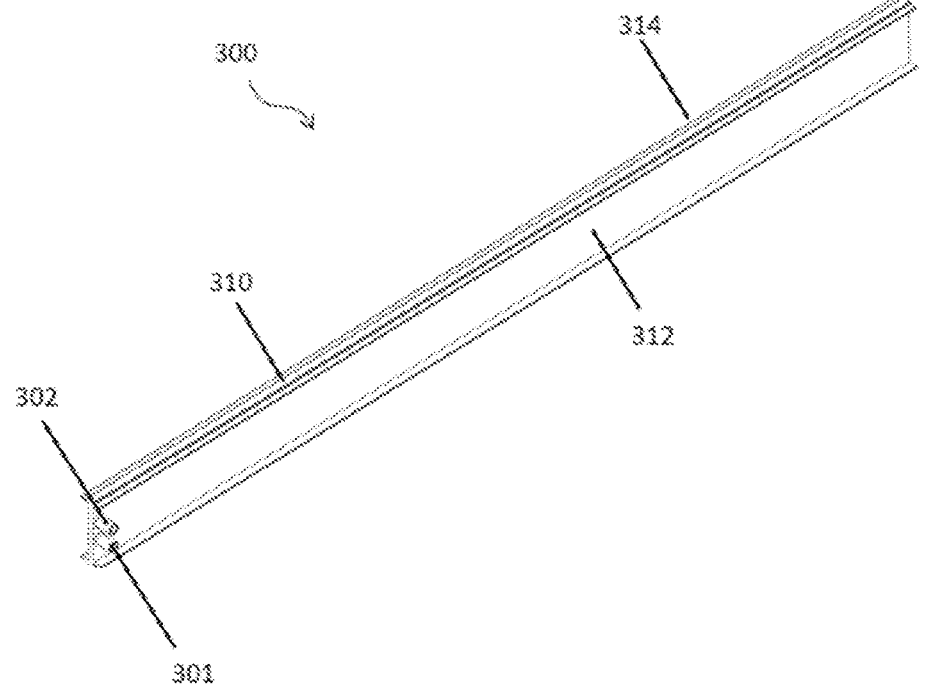
FIG. 5 is a perspective view of a cooling plate of a battery module according to an embodiment of the present application.

Referring to FIG. 3 and FIG. 5, the external shell optionally further comprises a cooling element 300 for supporting and cooling the plurality of cells 100. For example, the cooling element 300 made of a metallic material comprises a cooling plate 320 forming a third surface of each chamber abutting the rear surface 116 of the corresponding cell 100 such that the rear surface 116 of the cell set 110 is adhered to the cooling plate 320 by an electrically insulating and thermally conductive adhesive. The interior of the cooling plate 320 may be provided with variously shaped fluid channels and the cooling plate 320 has a length slightly longer than the length of the cell set 110 in the X-axis direction to provide an inlet 301 and an outlet 302 at one end of the cooling plate that extends beyond the length of the cell set 110 such that coolant from a coolant source may enter the cooling plate 320 from the inlet 301, flow through the variously shaped flow channels, and exit through the outlet 302. The inlet 301 and the outlet 302 for the coolant are located on the same side with the first end plate 220 to optimize wiring of the battery module 10.

Optionally, the cooling element 300 further comprises reinforcement ribs 310 provided on both sides of the cooling plate 320 and extending perpendicularly to the cooling plate 320, the reinforcement ribs 310 being attached to the external shell, for example, to two free ends 220 of each of the U-shaped profiled bodies 200 (referring to FIG. 4), by welding, gluing or other suitable means, such that the plurality of cells 100 is completely packaged.

Optionally, for improving the efficiency of the cooling element 300, the cooling plate 320 is provided with first and second cooling surfaces 312, 314 opposite to each other and the reinforcement ribs 310 are provided symmetrically with respect to the cooling plate 320 such that the cooling element 300 has an I-shaped cross section. Thus, the cell set 110 is divided into first and second cell sets 110a, 110b arranged in the same way and accordingly the plurality of chambers is divided into a first set of chambers for receiving the first cell set 110a and a second set of chambers for receiving the second cell set 110b, with the first cooling surface 312 forming the third surface of each chamber in the first set of chambers and the second cooling surface 314 forming the third surface of each chamber in the second set of chambers. Thus, the cooling element 300 support and cool the first and second cell sets 110a, 110b collectively.

Generally, in operation, the cell 100 may expand, i.e., increase in volume, when charging, or contract, i.e., decrease in volume, when discharging, in a reversible way. However, as the cell 100 ages, the cell 100 may begin to expand irreversibly to some extent, i.e., the volume of the cell 100 may increase irreversibly to some extent, and then, in operation, the irreversibly expanded cell 100 may expand when charging or contract when discharging. Both the change in the volume of the cell 100 due to the reversible expansion or contraction and the increase in the volume of the cell 100 due to the irreversible expansion may result in change in restraining force to the corresponding cell 100. In the case of excessive force to the corresponding cell 100 or uneven force to the whole cell set 110, the performance and life of the cell 100 will be affected and safety accidents may happen in serious cases.

Figure 6:
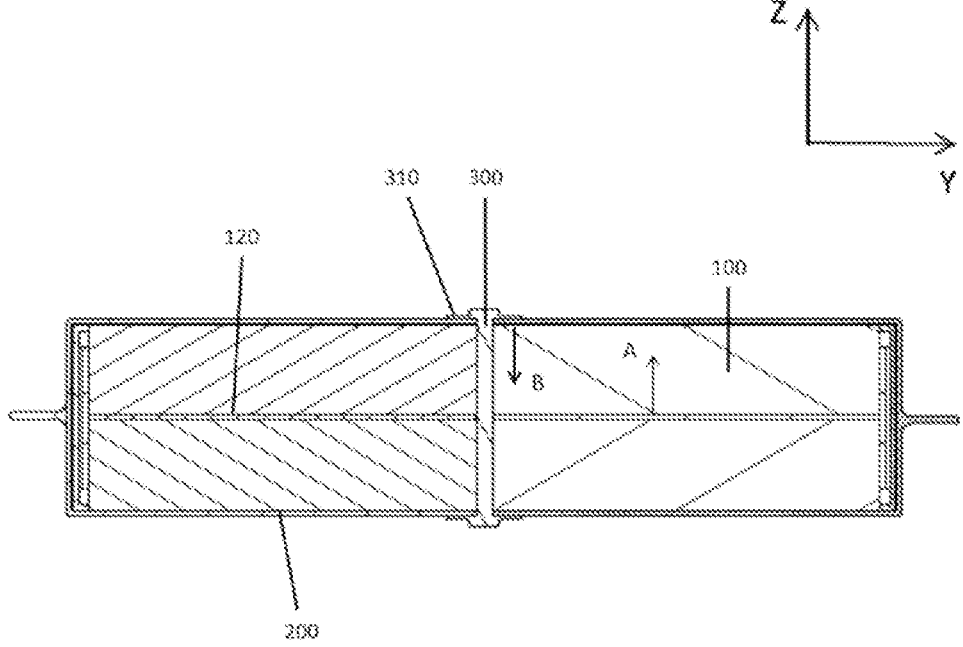
FIG. 6 is a cross-sectional view of the battery module of FIG. 1.

Referring to FIG. 6, the corresponding cell 100 in each chamber is restrained by the elastic element 120, the heat insulating element 140, the cooling element 300 and one profiled body 200 of the external shell in the present application. When the corresponding cell 100 is received and held in each chamber during the process of assembling the cells 100, the elastic element 120 is elastically deformed due to being pressed by the corresponding cell 100 by a predetermined amount such that the elastically deformed elastic element 120 exerts the first force A to the corresponding cell 100. The elastically deformed elastic element 120 is further deformed or tends to recover in responding to the reversible expansion or contraction of the corresponding cell 100 in operation such that the restraining force to the corresponding cell 100 is determined by the first force A. The elastic element 120 has an elastic property such that the change in the volume of the corresponding cell 100 has a small effect on the value of the first force A. Compared to the prior art in which restraining force is provided to cells 100 directly from a packaging shell, the first force A provided by the elastic element 120 is substantially constant and more favorable for the cell 100 in operation.

As the cell 100 ages, the elastically deformed elastic element 120 is further deformed to its elastic deformation limit in responding to the beginning of the irreversible expansion of the corresponding cell 100 in operation. At this point, the corresponding cell 100 along with the elastic element 120 that reaches its elastic deformation limit presses the profiled body 200 of the external shell, causing a slight deformation of the external shell such that the restraining force to which the cell 100 is subjected begins to be determined by the external shell. Thus, the restraining force to which the aging cell 100 is subjected is within a reasonable range, avoiding a rapid decay in the performance and life of the cell 100.

Finally, at the end of the life of the cell 100, the cell 100 expands too much and tends to deform the external shell greater, in which case the reinforcement ribs 310 apply a second force B to the plurality of cells 100 via an attachment surface of the external shell to which the reinforcement ribs is attached (i.e., the free ends 220 of the U-shaped profiled bodies 200) to avoid a failure of the packaging of the battery module 10. The second force B is greater than the first force A.

During the process of assembling the cells 100, the elastic element 120 is elastically deformed, i.e., preload, by the predetermined amount designed based on the elastic modulus of the elastic element 120 and the desired first force A. Additionally, the elastic element 120 may have a thickness designed based on the thickness of the corresponding cell 100 and a first expansion rate and/or contraction rate corresponding to the reversible expansion or contraction of the cell 100 in operation. For example, the first expansion rate and/or contraction rate is any value in a range of 0-2%. Alternatively, the elastic element 120 may have a thickness designed based on the thickness of the corresponding cell 100 and a second expansion rate corresponding to the beginning of the irreversible expansion of the corresponding cell 100 in operation. For example, the second expansion rate is any value in a range of 0-8%.

In addition, if one or more cells 100 in the battery module 10 are in a condition of thermal runaway in operation, the one or more cells 100 will be rapidly heat up and emit the smoke. On the one hand, the heat of the smoke will be transmitted to other cells 100 while the smoke is spreading, affecting the performance and safety of the whole battery module 10. On the other hand, the smoke contains a large amount of combustibles, and if the combustibles in the smoke are discharged from a pressure relief device of the battery module 10 to an external environment directly, these combustibles may burn along with air in the external environment, causing a safety risk.

Figure 7:
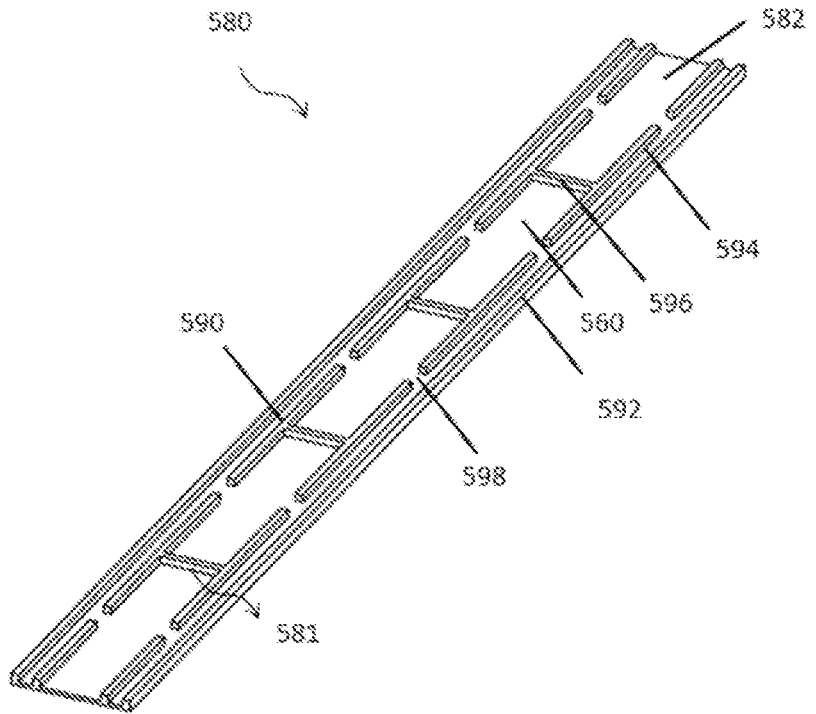
FIG. 7 is a perspective view of a smoke guide element of a battery module according to an embodiment of the present application.

Thus, referring to FIG. 3 and FIG. 7, the cell restraining structure further comprises a smoke guiding element 580 positioned between the external shell and the plurality of cells 100 and adhered to the external shell by an adhesive. The smoke guiding element 580 is configured to define common smoke passages 590 for the entire cell set 110.

Optionally, the smoke guiding element 580 comprises a body panel 582 with an area equal to that of the front surface 118 of the cell set 110, the body panel 582 being made of an electrically insulating material with a high thermal conductivity so as not to impede heat dissipation from the front surface 118 of the cell set 110. The smoke guiding element 580 in FIG. 7 is rotated relative to the smoke guiding element 580 in FIG. 3 by 90° to show an engagement surface of the body panel 582 that faces the chamber or cell 100, the engagement surface being provided with a flange protruding perpendicular to the body panel 582. For example, the flange is configured to be substantially straight strips.

Optionally, the flange comprises first flange portions 592 disposed on both sides of the engagement surface, second flange portions 594 spaced inwardly from the first flange portions 592 and extending parallel with the first flange portions 592, and third flange portions 596 formed between and extending perpendicular to the two second flange portions 594 so as to be connected to the two second flange portions 594. The third flange portions 596 comprises a plurality of third flange portions 596 disposed parallel to each other with an interval corresponding to the width of each cell column along the X-axis. By resting the flange against the front surface 118 of the cell set 110, the first and second flange portions 592, 594 along with the front surface 118 of the cell set 110 form the smoke passages 590, and the second flange portions 594, every two of the third flange portions 596 adjacent to each other along with the front surface 118 of each cell columns form an interspace 560. The number of the interspaces 560 corresponds to the number of the cell columns. The interspace 560 has an area slightly smaller than the area of the front surface 118 of each cell column due to the presence of the smoke passages 590. Also, the second flange portions 594 each are provided with at least one opening 598 accessing each of the interspaces 560 to the smoke passages 590 so as to allow the smoke to flow primarily through the smoke passages 590 to the filter element.

Optionally, the first flange portions 592 are made of an electrically insulating material with a high thermal conductivity to facilitate heat dissipation from the front surface 118 of the cell set 110 to the external environment, while the second and third flange portions 594, 596 are made of an electrically insulating material with a low thermal conductivity to mitigate heat dissipation from one cell 100 that is in a condition of thermal runaway to the other cells 100.

Figure 8:
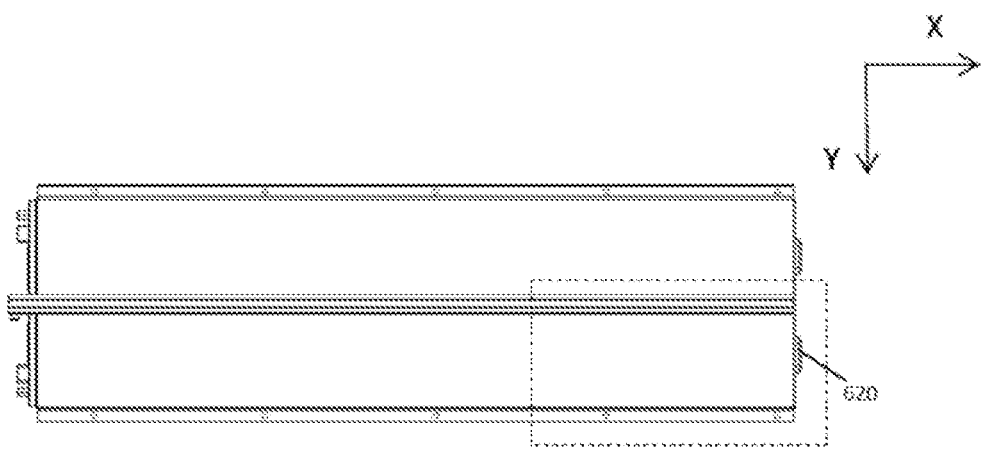
FIG. 8 is a top view of the battery module of FIG. 1.
Figure 9:
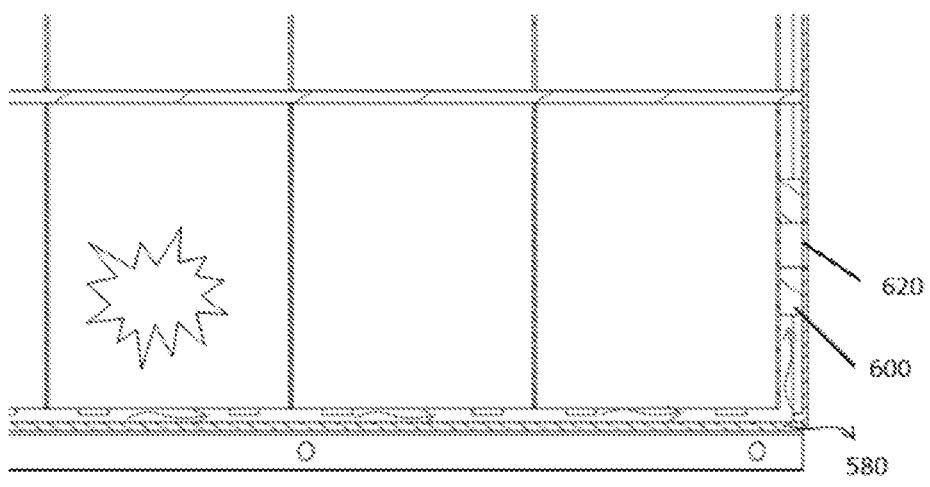
FIG. 9 is a cross-sectional view of a part of the battery module in a dashed box of FIG. 8.

Referring to FIG. 8 and FIG. 9, in the case where the one cell 100 of the cell set 110 that is in the condition of thermal runaway emits the smoke into the interspace 560, the smoke in the interspace 560 flows through a corresponding opening 598 to the smoke passages 590 and the smoke flowing to the smoke passages 590 is directed to the filter element 600 located at the second end plate 240 such that the smoke containing the combustibles can be filtered out of the combustibles and then discharged from the pressure relief element 620 to the external environment. Optionally, the pressure relief element 620 comprises a pressure relief valve that is positioned horizontally such that the smoke is discharged laterally to the external environment.

Optionally, a thermal insulating pad may be disposed on a surface of the plurality of cells 100 that faces the smoke guiding element 580 (i.e., the front surface 118 of the cell set 110), exposing only the positive and negative tabs of each cell 100 so as to prevent backflow of the smoke emitted by the corresponding cell 100 that is in the condition of thermal runaway from affecting adjacent cells 100.

It will be appreciated that other configurations of the smoke passages 590 are also conceivable, provided that such smoke passages 590 direct the smoke emitted by the corresponding cell 100 in a relatively simple and rapid manner.

Although some specific embodiments of the present application have been demonstrated in detail with examples, it should be understood by those skilled in the art that the above examples are only intended to be illustrative but not to limit the scope of the present application and the above embodiments could be modified without departing from the scope and spirit of the present application.

The invention claimed is:

1. A battery module comprising:

a plurality of cells; and a cell restraining structure for packaging and managing the plurality of cells, the cell restraining structure comprising an internal frame and an external shell fit with the internal frame to form a plurality of chambers for receiving the plurality of cells respectively, wherein the internal frame comprises an elastic element forming at least one first surface of each of the plurality of chambers, the elastic element being elastically deformed as being pressed by a predetermined amount by a corresponding cell received in each of the plurality of chambers such that the elastically deformed elastic element exerts a first force to the corresponding cell, wherein the elastically deformed elastic element is further deformed or tends to recover in responding to reversible expansion or contraction of the corresponding cell in operation such that a restraining force to the corresponding cell is determined by the first force, and wherein the cell restraining structure further comprises a smoke guiding element interposed between the external shell and front surfaces of the plurality of cells, each front surface comprising positive and negative tabs, the smoke guiding element comprising a body panel and a flange disposed at a surface of the body panel that faces the plurality of cells, the flange resting against the front surfaces of the plurality of cells and comprising two first flange portions protruding perpendicular to the body panel on both sides of the body panel, two second flange portions spaced inwardly from the two first flange portions and extending parallel to the two first flange portions, and a plurality of third flange portions formed between the two second flange portions and extending perpendicular to the two second flange portions, the plurality of third flange portions disposed parallel to each other with an interval corresponding to a width of each of the plurality of cells, and at least one of the two second flange portions being provided with an opening between two of the plurality of third flange portions adjacent to each other.

2. The battery module according to claim 1, wherein the elastically deformed elastic element is further deformed to its elastic deformation limit in responding to a beginning of an irreversible expansion of the corresponding cell in operation.

3. The battery module according to claim 1, wherein the elastic element is a laminate comprising two elastic layers and a thermal insulating layer interposed between the two elastic layers.

4. The battery module according to claim 1, wherein the internal frame further comprises a thermal insulating element forming at least one second surface of each of the plurality of chambers, the thermal insulating element supporting the plurality of cells and having a low thermal conductivity.

5. The battery module according to claim 4, wherein the elastic element comprises a plurality of elastic elements and the thermal insulating element comprises a plurality of insulating elements, the pluralities of elastic elements and thermal insulating elements being arranged alternately and to be perpendicular to each other to form the at least one first and second surfaces of each of the plurality of chambers, the first surface having an area greater than that of the second surface.

6. The battery module according to claim 1, wherein the battery module comprises a cooling element for supporting and cooling the plurality of cells and comprising a cooling plate for forming a third surface of each of the plurality of chambers, the cooling plate being adhered to the plurality of cells via a thermally conductive adhesive.

7. The battery module according to claim 6, wherein the external shell covers the internal frame and is connected to the cooling plate to enclose the plurality of chambers.

8. The battery module according to claim 7, wherein the cooling element comprises reinforcing ribs extending perpendicularly to the cooling plate on both sides of the cooling plate, the reinforcing ribs being connected to the external shell and being capable of applying a second force greater than the first force to the plurality of cells via the external shell.

9. The battery module according to claim 6, wherein the plurality of chambers is divided into first and second sets of chambers and the cooling plate comprises first and second cooling surfaces opposite with each other, the first cooling surface forming a third surface of each of the first set of chambers and the second cooling surface forming a third surface of each of the second set of chambers.

10. The battery module according to claim 1 wherein the cell restraining structure comprises an electrically insulating element interposed between the external shell and the plurality of cells, the electrically insulating element being adhered to the external shell and the plurality of cells by a thermally conductive adhesive and having a high thermal conductivity.

11. The battery module according to claim 1, wherein the body panel is made of an electrically insulating material having a high thermal conductivity, the body panel having a surface facing the external shell and being adhered to the external shell by a thermally conductive adhesive.

12. The battery module according to claim 1, wherein the first flange portions are made of a material with a high thermal conductivity and the second and third flange portions are made of a material with a low thermal conductivity.

13. The battery module according to claim 1, wherein a thermal insulating pad is disposed on a surface of the plurality of cells that faces the smoke guiding element.

14. The battery module according to claim 1, wherein the external shell comprises a pressure relief valve disposed on one end side of the battery module, the pressure relief valve being oriented horizontally such that smoke flowing through the smoke guiding element to the pressure relief valve is discharged laterally to an external environment.

15. The battery module according to claim 14, wherein the pressure relief valve is covered by a filter element such that the smoke flowing through the smoke guiding element to the pressure relief valve is filtered by the filter element in advance.

16. An electric vehicle comprising:

a battery module compartment; and one or more battery modules according to claim 1 to be fit into the battery module compartment by one or more physical or electrical connectors.

\*    \*    \*    \*    \*